United States Patent [19]

Meinunger

[11] 4,317,553

[45] Mar. 2, 1982

[54] PROJECTION SCREEN STAND

[75] Inventor: Helmut Meinunger, Radevormwald, Fed. Rep. of Germany

[73] Assignee: Mechanische Weberei GmbH, Bad Lippspringe, Fed. Rep. of Germany

[21] Appl. No.: 154,226

[22] Filed: May 29, 1980

[30] Foreign Application Priority Data

May 30, 1979 [DE] Fed. Rep. of Germany ....... 2922027

[51] Int. Cl.³ .............................................. F16M 11/38
[52] U.S. Cl. ..................................... 248/171; 211/203
[58] Field of Search ............... 248/168, 169, 170, 171, 248/188.7, 164, 121, 167, 434, 435; 211/203, 205

[56] References Cited

U.S. PATENT DOCUMENTS

| 1,008,545 | 11/1911 | Humphrey | 248/171 |
|---|---|---|---|
| 1,591,110 | 7/1926 | Willson | 248/165 X |
| 1,780,308 | 11/1930 | Morris | 248/171 X |
| 1,786,308 | 12/1930 | Latourelle et al. | 248/171 X |
| 2,502,667 | 4/1950 | Pagett . | |
| 2,542,137 | 2/1951 | Hanson | 248/171 |
| 3,214,121 | 10/1965 | Armstrong . | |
| 3,324,928 | 6/1967 | Muller | 248/171 X |
| 4,121,799 | 10/1978 | Michio | 248/171 |

FOREIGN PATENT DOCUMENTS

| 129895 | 11/1948 | Australia | 211/203 |
|---|---|---|---|
| 972761 | 2/1951 | France . | |
| 2063267 | 9/1971 | France . | |
| 19053 | 4/1899 | Switzerland . | |

*Primary Examiner*—J. Franklin Foss
*Attorney, Agent, or Firm*—Karl F. Ross

[57] ABSTRACT

A stand, especially for a projection screen, having a plurality of spreadable legs, comprises a post which is preferably of telescoping type, at the lower end of which is provided a guide for the legs. The legs are pivotal on a member which can be slid along the post so that in an upper position the legs are swung inwardly to form a compact, readily transportable and easily stored unit with the post. When the pivot carrier is moved downwardly toward the guide, the legs are spread apart outwardly.

10 Claims, 3 Drawing Figures

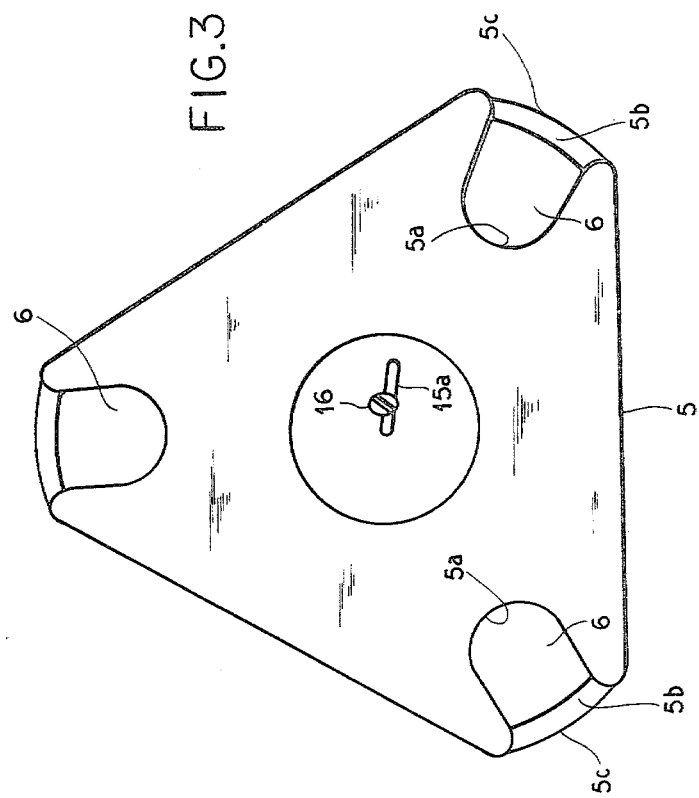

PROJECTION SCREEN STAND

CROSS REFERENCE TO RELATED APPLICATION

The present application is related to my commonly assigned copending application Ser. No. 148,123 filed May 9, 1980.

FIELD OF THE INVENTION

The present invention relates to a projection-screen stand and, more particularly, to a collapsible stand for the post of a projection screen which, in its collapsed or compact state, has its legs disposed close to the post in a compact configuration for transportation and storage whereas, in the expanded state of the legs, the latter can engage the ground or floor surface at widely-spaced points for great stability.

BACKGROUND OF THE INVENTION

Projection screens, e.g. of the type described in the aforementioned copending application, are generally provided with telescopingly extendable posts, carrying the projection screen in a tube which can be swung from a position in which the tube lies parallel to the post (for transportation or storage) into a position in which the tube extends transversely and horizontally so that the web of the screen can be withdrawn from the tube and fully extended.

The post is also generally equipped with a stand at its lower end having a plurality of spreadable legs which, in their outwardly spread position, can provide a purchase upon the ground or on a floor at a plurality of spaced apart locations to afford stability to the screen. It is also customary to construct the stand so that the legs can be contracted toward the post, i.e. to make the stand collapsible and thereby facilitate storage or transportation of the stand.

Earlier devices for this purpose included articulated arms and like complicated mechanisms which interfered with esthetics of the device and were prone to failure or were difficult to operate.

OBJECTS OF THE INVENTION

It is the principal object of the present invention, therefore, to provide a stand for a post which can be displaced between collapsed and extended positions and which avoids the disadvantages of prior art systems.

Another object of the invention is to provide an inexpensive, readily manipulated collapsible stand for the purpose described, especially for a projection screen, which provides high stability in the extended projection and a compact construction in the contracted position.

It is also an object of this invention to provide an exceptionally reliable collapsible stand for the post of a projection screen which has an esthetic appearance in both its collapsed and its extended positions, i.e. has clean lines, a minimum number of moving parts and a particularly stable spread position.

SUMMARY OF THE INVENTION

These objects and others which will become more readily apparent hereinafter are attained, in accordance with the present invention, in a stand for a post, particularly the post of a projection screen, which comprises a guide body mounted at the lower end of the post and provided with a plurality of angularly spaced openings in which respective legs of the stand are guided, above this guide body, a pivot body to which respective ends of the legs are pivotally connected and which can be shifted axially along the post toward and away from the guide body.

According to the invention, the openings are elongated and extend radially with respect to the post. This affords automatic spreading and contracting of the legs upon movement of the pivot body toward and away from the guide body.

The stand of the present invention is far more effective than arrangements requiring articulated arms which are pivotally connected to both the post and the legs.

According to a feature of the invention, the guide body is formed on its side with a central substantially annular recess in which the pivot-carrying body is receivable, i.e. the pivot-carrying body can be embraced and received in the stationary guide body when the former is in its lower position. In the spread condition of the legs, therefore, the overall height of the spreading assembly is relatively small and the fastening mechanism likewise compact so as not to provide an eyesore or detract the attention of the viewer from the subject projected on the screen.

The radial openings for the legs can extend from the upper side of the guide body and the radial recesses thereof to below vertical walls outwardly closing each recess. The radial openings thus terminate below these walls at the underside which can be part of a cap serving to mount the guide body on the lower end of the post. According to another feature of the invention, the pivot-carrying body is provided with a detent for indexing this body on the post in each of its end or limiting positions. In this case, the pivot body can comprise an upwardly extending cylindrical collar formed unitarily with an inwardly biased spring element having a projection or nose engageable selectively in openings formed in the post at the upper and lower ends of the travel of the pivot-forming body. The spring element may be formed by or can form part of the collar.

According to yet another feature of the invention, the post is provided at least part of the way along the path of the pivot-carrying body with a longitudinal slot into which an inward projection of the collar may extend to limit relative angular displacement of the pivot-carrying body and the post.

Between the two bodies I can provide a spring which is preferably disposed within the post, the latter being tubular to receive the spring. This tension can have one end connected to a bent rod affixed to the movable body while its other end is connected at the cap to the stationary or guide body, the bent rod reaching through the slot into the post. The spring can, upon disengagement of the detent, automatically shift the stand into its spread position. If a compression spring is used, the spring can automatically displace the stand into its collapsed position.

BRIEF DESCRIPTION OF THE DRAWING

The above and other objects, features and advantages of the present invention will become more readily apparent from the following description, reference being made to the accompanying drawing in which:

FIG. 3 is a bottom view of the guide body.

SPECIFIC DESCRIPTION

Figure 1:
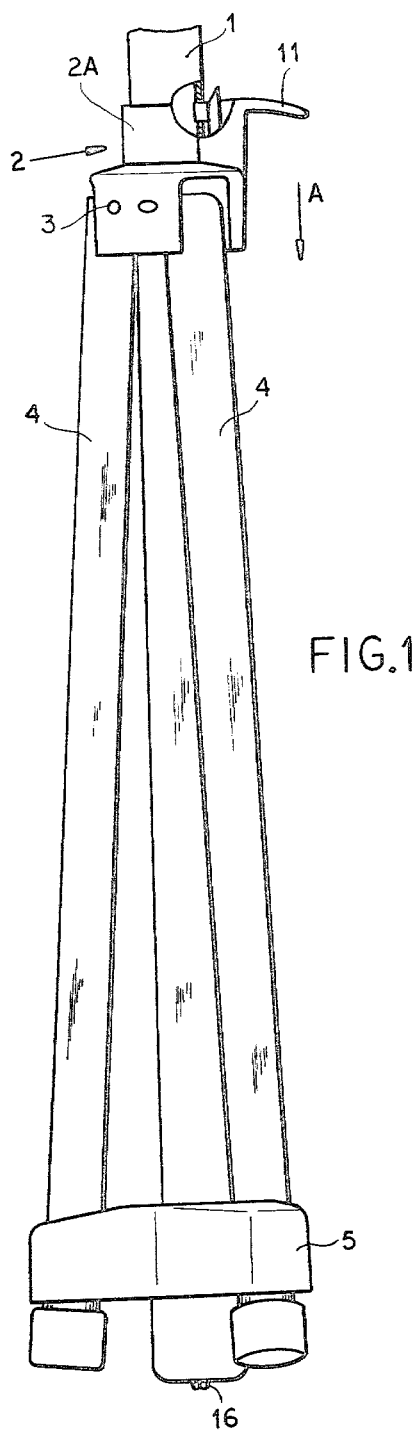
FIG. 1 is an elevational view of the lower end of a projection screen assembly showing its stand in the collapsed position.

The stand of the present invention, which is particularly effective for a projection screen assembly of the type described in the aforementioned copending application, comprises a post in the form of a tube 1 which can be of the telescopingly extendable type and which carries a slidable pivot-carrying body 2 to which pivotal pins or bolts 3 connect respective spreadable legs 4 at one end of each of these legs. The legs may be pivotally attached to the body 2 in angularly equispaced relationship, i.e. with angular offsets of 120° from one another.

Each leg 4 passes through an opening 7 in a guide body 5 fixed to the lower end of the post 1.

The openings 6 are formed on the underside of this body 5 and are constituted as radially outwardly extending longitudinal slots whose widths correspond to the width of the leg and whose lengths are somewhat longer than the vertical projection of the cross section of the leg in its spread position so that the leg can swing outwardly.

The openings 7 in the upper portion of body 5 can extend radially outwardly to vertical walls 5C at the extremities of the body 5 and can terminate at a central annular recess 8 which receives the movable body 2.

The central bottom portion of body 5 is formed as a cap which can be forced onto the lower end of post 1 and held in place thereon by a pin 17 or the like. The guide body 5 thus has the configuration in plan view of a triangle with rounded corners (see FIG. 3) with the openings extending in the direction of these corners.

The pivot-forming body 2 is provided at its upper end with a cylindrical collar 2A which surrounds the post 1 except for a spring element 9 and a projection 13.

The spring element 9 is formed in the collar 2A and is provided with a projection 9A which can engage a recess 10A or a recess 10B in the post 1 in the spread or contracted position of the legs, respectively.

In the preferred embodiment shown in the drawing, the spring 9 is formed as a tongue unitarily on the body 2 which can be composed of synthetic resin.

To facilitate disengagement of the detent from the recess 10A or 10B, the tongue is provided with an actuating lug 9B.

Diametrically opposite the side provided with recesses 10A and 10B, the post 1 is formed with longitudinal slot 12, into which the rib 13 of body 2 projects to prevent relative angular displacement of the body 2 and the post, i.e. rotation of body 2 about the post.

A bent rod 14 is fixed in this rib and has a loop portion 14A extending within the post and engaging a tension spring 15 whose other end is connected by a screw 16 to the underside of body 5.

When this traction spring is used, it automatically draws the slider body 2 downwardly and spreads the legs 4 when the detent 9 is released from the recess 10B. Naturally, a compression spring can be substituted, in which case the release of the detent 9A from the recess 10A will bias member 2 upwardly to swing the legs into the contracted position.

If the space within the post is required to receive the telescoping tubes, the spring can be omitted and member 2 shifted completely by hand.

Figure 2:
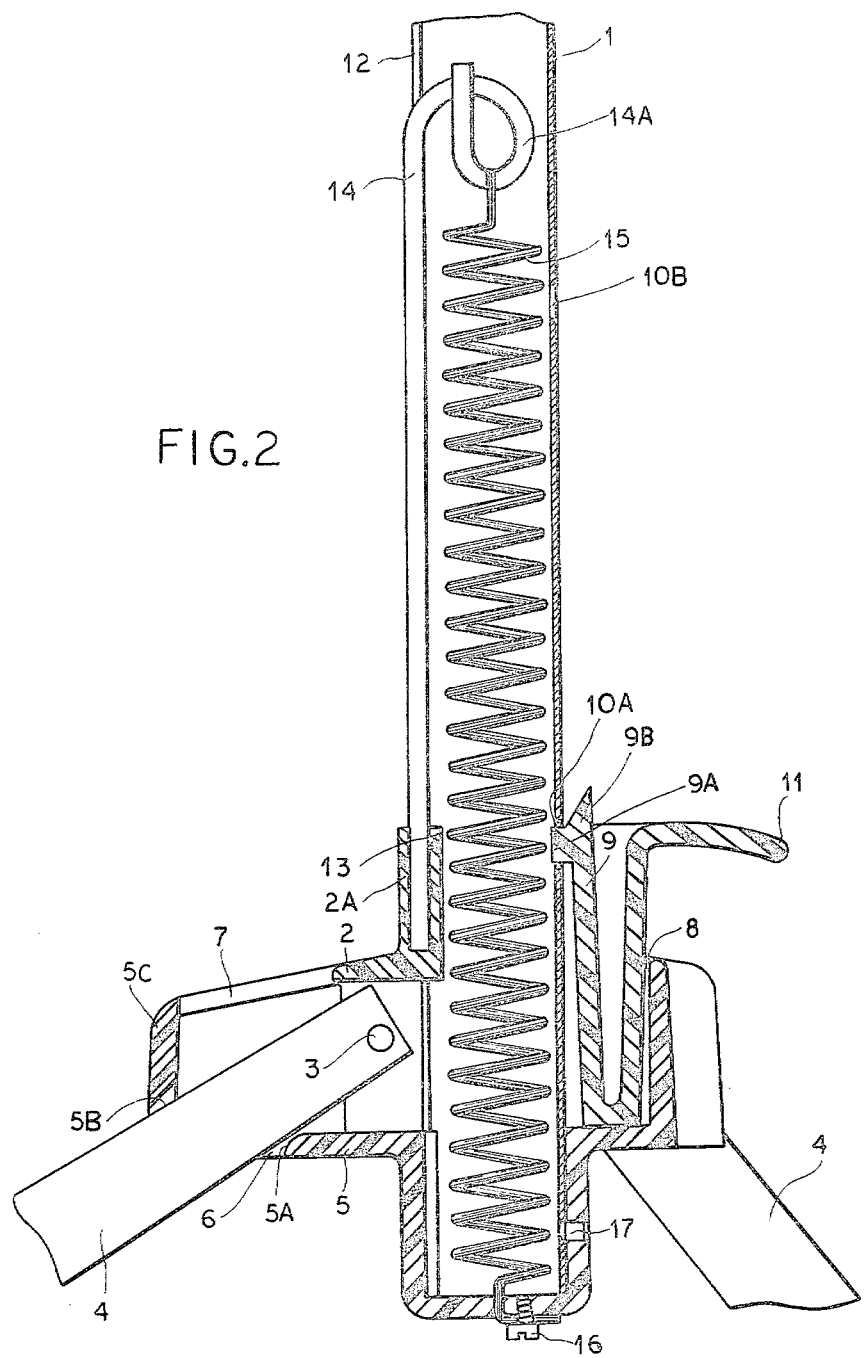
FIG. 2 is a longitudinal cross-sectional view of the lower portion of the post showing the stand in its spread position.

The handle 11 allows the member 2 to be moved along the post readily while a lug 9B permits the finger of the user to engage the tongue and withdraw the projection 9A from the respective bore. The projection 9A may automatically jump into the bore 10A or 10B upon its registry therewith. Movement of body 2 in the direction of arrow A spreads the legs (see FIG. 2) while movement of member 2 in opposite direction brings the legs together (see FIG. 1).

I claim:

1. A stand, especially for a projection screen, comprising:
    a post;
    a pivot-carrying body slidable along said post;
    a plurality of legs pivotally connected at one end of each leg to said body at spaced-apart locations thereon whereby said legs are swingable relative to said body; and
    a guide body fixed to said post at a lower end thereof and formed with respective elongated openings each extending radially outwardly from said post and slidably receiving a respective leg whereby displacement of said pivot-carrying body toward said guide body spreads said legs and displacement of said pivot-carrying body away from said guide body contracts said legs toward said post, said guide body being provided on an upper side thereof with an annular recess receiving said pivot-carrying body.

2. The stand defined in claim 1 wherein said guide body is formed with additional radial openings extending outwardly from said recess to vertical walls, the undersides of which define the outer ends of the first-mentioned openings traversed by said legs.

3. The stand defined in claim 2 wherein said guide body is provided with a central cap mounted on and receiving the lower end of said post.

4. The stand defined in claim 1 wherein said pivot-carrying body is formed with a detent for selectively indexing said pivot-carrying body on said post in axially spaced limiting positions corresponding to spread and contracted positions of said legs.

5. The stand defined in claim 4 wherein said pivot-carrying body is formed with a cylindrical collar surrounding said post, said detent being formed on a spring tongue provided on said collar.

6. The stand defined in claim 5 wherein said collar is provided with an inwardly projecting rib and said post has a longitudinal slot receiving said rib, thereby preventing angular displacement of said pivot-carrying body around said post.

7. The stand defined in claim 6, further comprising spring means between said bodies for urging said pivot-carrying body into an end position thereof.

8. The stand defined in claim 7 wherein said spring means is a coil spring received in said post and said pivot-carrying body is provided with a bent rod connecting same with said coil spring and reaching through said slot.

9. A stand, especially for a projection screen, comprising:
    a post;
    a pivot-carrying body slidable along said post;
    a plurality of legs pivotally connected at one end of each leg to said body at spaced-apart locations thereon whereby said legs are swingable relative to said body;

a guide body fixed to said post at a lower end thereof and formed with respective openings each slidably receiving a respective leg whereby displacement of said pivot-carrying body toward said guide body spreads said legs and displacement of said pivot-carrying body away from said guide body contracts said legs toward said post, said pivot-carrying body being formed with a cylindrical collar surrounding said post, a detent on said collar for selectively indexing said pivot-carrying body on said post in axially spaced limiting positions corresponding to spread and contracted positions of said legs, and an inwardly projecting rib, said post having a longitudinal slot receiving said rib, thereby preventing angular displacement of said pivot-carrying body around said post; and spring means between said bodies for urging said pivot-carrying body into an end position thereof, and spring means comprising a coil spring received in said post and said pivot-carrying body being provided with a bent rod connecting same with said coil spring and reaching through said slot.

10. A stand, especially for a projection screen, comprising:

a post;

a pivot-carrying body slidable along said post between axially spaced limiting positions, said post having axially spaced openings corresponding to said locations;

a plurality of legs pivotally connected at one end of each leg to said pivot-carrying body at spaced-apart locations thereon whereby said legs are swingable relative to said pivot-carrying body, said pivot-carrying body being provided with a cylindrical collar surrounding said post and formed unitarily with an inwardly biased spring tongue having a projection selectively engageable in said openings for indexing said pivot-carrying body in said positions; and a guide body fixed to said post at a lower end thereof and formed with respective openings each slidably receiving a respective leg whereby displacement of said pivot-carrying body toward said guide body spreads said legs and displacement of said pivot-carrying body away from guide body contracts said legs toward said post.

* * * * *